United States Patent [19]
Lewis

[11] Patent Number: 5,230,850
[45] Date of Patent: Jul. 27, 1993

[54] FAN BLADE REINFORCEMENT USING BONDED HOLLOW SPHERES

[76] Inventor: Raymond O. Lewis, Rte. 5, Box 688, Muskogee, Okla. 74401-9347

[21] Appl. No.: 701,105

[22] Filed: May 16, 1991

[51] Int. Cl.$^5$ .............................................. B29C 67/00
[52] U.S. Cl. .................................... 264/112; 264/113; 264/128
[58] Field of Search ................ 264/112, 113, 128, 123

[56] References Cited

U.S. PATENT DOCUMENTS

| | | | |
|---|---|---|---|
| 2,774,108 | 12/1956 | Wyllie | 264/128 |
| 3,383,446 | 5/1968 | Brennecke | 264/128 |
| 3,598,672 | 8/1971 | Heller | 264/113 |
| 3,608,010 | 9/1971 | Stayner | 264/51 |
| 3,608,029 | 9/1971 | Hough | 264/112 |
| 3,640,787 | 2/1972 | Heller | 156/77 |
| 3,909,058 | 9/1975 | Kramer . | |
| 4,405,543 | 9/1983 | Murphy et al. | 264/123 |
| 4,468,363 | 8/1984 | Miessler | 264/128 |
| 4,657,810 | 4/1987 | Douden | 428/313.9 |
| 4,695,343 | 9/1987 | Wycech | 156/196 |
| 4,836,967 | 6/1989 | Frantl et al. | 264/69 |

Primary Examiner—Mary Lynn Theisen
Attorney, Agent, or Firm—Head & Johnson

[57] ABSTRACT

This invention is a process by which fan blades or any shape needing a lightweight reinforcement are strengthened using hollow spheres, bonded together with an adhesive material used as a matrix. This combination of hollow spheres and adhesive matrix forms a lightweight construction that exhibits extremely high compressive strength. Thermoplastic or thermosetting resins may be used for a matrix material. A plurality of hollow spheres, all being the same size, are inserted into the area to be reinforced. The spheres being round in shape and light in weight, flow easily with fluidic properties, although slight agitation will ensure complete distribution, settling, and contact of each hollow sphere to the next in an organized, virtually symmetrical fashion. The matrix material is then inserted into the interstices surrounding the hollow spheres, forming a bond between each hollow sphere, and mechanically joining them; thus forming a bonded, lightweight reinforced fan blade.

20 Claims, 2 Drawing Sheets

FAN BLADE REINFORCEMENT USING BONDED HOLLOW SPHERES

TECHNICAL FIELD

This invention pertains to the manufacture of fan blades and more particularly it relates to improved blade construction, through the use of hollow spheres for the purpose of reinforcement, giving increased compressive strength while maintaining a light weight.

BACKGROUND

Discussion of Prior Art

The design concepts and production techniques used in the manufacture of airfoil shaped fan blades have not been significantly changed for quite some time. Conventional construction of airfoil shaped fan blades has been to form the airfoil blade shape using dies and an appropriate metal alloy of sufficient thickness and strength to meet the stress criteria required to maintain mechanical integrity for a fan operating within its specified limits. If higher specified operating limits are required for a particular fan design, the material thickness of the blades and their supporting rotor assembly must be increased for strength. This also adds to the weight of the assembly, thereby also increasing stresses brought about by centrifugal forces. Destructive centrifugal forces are calculated by dividing the new revolutions per minute by the known revolutions per minute, squaring this dividend, and multiplying this squared product by the known stress, thus giving the new stress level; or more simply shown in the following formula:

Formula: New stress = Known stress × (New revolutions per minute ÷ Known revolutions per minute)$^2$ It can be seen, by one knowledgeable of the principles involved, that increasing blade material thickness to increase operating speed range reaches a point of diminishing returns. To overcome this problem, present practice is to change the blade material to a stronger alloy (an alloy with a higher tensile strength) or adding reinforcing ribs to the inside of the blade, the latter being very labor intensive and both solutions add weight or cost, or both, to the assembly. A subsequent detrimental effect of the prior art is, with this increase in weight of the blades and supporting wheel assembly, designed to give greater operating speeds, the other rotating parts of the fan may have to be strengthed or enlarged (for example, fan shafts, bearings, motors, etc.). The aforesaid adds up to a considerable increase in the cost of the fan assembly.

It is also known that hollow shapes can be strengthened by filling cavity with a structural foam plastic, as shown in Kramer U.S. Pat. No. 3,909,058 issued Sep. 30, 1975. A disadvantage of this process is that a very limited increase in strength is achieved.

It is also known that shapes and airfoil sections can be reinforced by filling them with macrosphere clusters formed from bonded microspheres, as described by Murphy and Phillips U.S. Pat. No. 4,405,543 issued Sep. 20, 1983.

It is further known that a similar method of using macrosphere clusters formed of bonded microspheres to reinforce structural members was shown by Wycech U.S. Pat. No. 4,695,343 issued Sep. 22, 1987.

A disadvantage to both of the aforesaid processes is that the clusters are made up of groups of bonded hollow microspheres, this forming irregular-shaped macrosphere clusters, with the microspheres used in these macrosphere clusters ranging in size from approximately 0.020 mm. to 0.150 mm. Establishing sizing guidelines from the prior art, it has been indicated, generally, that microspheres would be of a size that is less than 0.5 mm., and macrospheres would be of a size that is 0.5 mm. or greater. It can be seen, by one knowledgeable in the art, that these macrosphere clusters are going to range widely in size and shape, which will keep the macrosphere clusters from flowing smoothly, settling, or packing tightly; thus leaving irregular, open air space interstices between the macrosphere clusters. This prevents the final cured and bonded shape from having the highest compressive strength possible for reinforcement purposes.

It is still further known that a plurality of bonded macrospheres may be bonded into a low density, rigid mass, as stated by Douden U.S. Pat. No. 4,657,810 issued Apr. 14, 1987. A disadvantage to this process is that using hollow spheres of random sizes will not allow for the hollow spheres to pack tightly; thus leaving irregular, open air space interstices between the macrospheres. This prevents the final cured and bonded shape from having the highest compressive strength possible for reinforcement purposes; nor does it imply that a matrix material can be inserted into the open space interstices around the macrosphere clusters to form a solid mass; thus giving the highest compressive strength possible for reinforcement purposes.

In all the aforesaid patents, the uses do not include utilizing the bonded spheroid mass as a reinforcement for a fan blade shape that will be subjected to rotation, and the subsequent centrifugal forces imposed by this rotation.

SUMMARY OF INVENTION

According to this invention, a method is provided by which fan blades, needing a light weight reinforcement, are strengthed using hollow spheres (for example, ceramic spheres by Microcel Technology, Inc., glass or ceramic spheres by 3M Co.) bonded together with an adhesive material used as a matrix. This combination of hollow spheres and adhesive matrix, inside a fan blade, forms a lightweight cellular type construction that exhibits extremely high compressive strength. Either thermoplastic or thermosetting resins may be used for a matrix material.

Generally, a plurality of hollow spheres, all being approximately the same size, are inserted into the hollow area of the fan blade to be reinforced. The plurality of hollow spheres, being round in shape and light in weight, flow easily with fluidic properties, although slight agitation will ensure complete distribution, settling, and contact of each hollow sphere to the adjacent hollow spheres, in an organized, virtually symmetrical fashion. The matrix material, being a thermoplastic or thermosetting resin, is then inserted into the interstices adjacent to points of contact of the hollow spheres, forming a bond between adjacent hollow spheres, and mechanically joining them; thus forming a reinforced fan blade.

In one embodiment, the fan blade shape is formed using prior art, although the blade material thickness can be reduced, or a less expensive, lower strength alloy, or suitable laminate, might be utilized. A plurality of hollow spheres, all being approximately the same size, is inserted into the hollow area of the fan blade until full. The type and size of the hollow spheres is determined in accordance with the desired properties. An adhesive matrix material, the choice being dependent upon the particular demands of the intended application, is inserted into the interstices adjacent to points of contact of the hollow spheres until full, and cured by suitable means; thus forming a bonded, lightweight, reinforced fan blade.

In a second embodiment, the fan blade shape is formed using prior art, although the blade material thickness can be reduced or a less expensive lower strength alloy or suitable laminate might be utilized. A plurality of hollow spheres, all being approximately the same size, is precoated with a thermosetting resin or plastic, forming a moist mass. The moist mass is separated into individual spheres and allowed to dry. The selection of an adhesive or thermosetting material is dependent upon the particular demands of the intended application. The precoated hollow spheres are inserted into the hollow area of the fan blade, packing closely, until full. The type and size of the hollow spheres is determined in accordance with the desired properties. Curing is implemented, by suitable means, and subsequent bonding of the hollow spheres is accomplished. The hollow spheres are bonded to one another and to the blade material at all points of contact, allowing for open interstices adjacent to the aforesaid points of contact. This method thus forms a bonded, lightweight, reinforced fan blade.

In a third embodiment, a preformed mold of a fan blade is lined with resin-impregnated reinforcing fibers. A plurality of hollow spheres, all being approximately the same size, is precoated with a thermosetting resin or plastic, forming a moist mass. The moist mass is separated into individual spheres and allowed to dry. The selection of an adhesive or thermosetting material is dependent upon the particular demands of the intended application. The precoated spheres are inserted into the resin-impregnated fiber-lined mold cavity until full. The type and size of the hollow spheres is determined in accordance with the desired properties. Curing is implemented by suitable means, and subsequent bonding of the hollow spheres is accomplished. The hollow spheres are bonded to one another and the fiber reinforcing skin, at all points of contact. Upon separation of blade from mold, this method forms a bonded, self-contained, lightweight, reinforced fan blade.

In a fourth embodiment, the fan blade shape is formed using prior art, although the blade material thickness can be reduced or a less expensive, lower strength alloy or suitable laminate might be utilized. A plurality of hollow spheres, all being approximately the same size, is mixed with the appropriate matrix material. The size and type of hollow spheres, and the selection of the matrix material is dependent upon the particular demands of the application. The hollow spheres and matrix material are blended to a homogeneous mixture. This homogeneous mixture, having fluidic properties, is inserted into the hollow area of the fan blade until full, and cured; thus forming a bonded, lightweight, reinforced fan blade.

The fifth embodiment is the utilization of a preformed mold of a fan blade. A plurality of hollow spheres, all being approximately the same size, is mixed with the appropriate matrix material. The size and type of the hollow spheres, and the selection of a matrix material, is dependent upon the particular demands of the application. The hollow spheres and matrix material are blended to a homogeneous mixture. This homogeneous mixture, having fluidic properties, is inserted into the hollow area of the mold cavity until full, and cured. Upon separation of blade from mold, this method forms a bonded, self-contained, lightweight, reinforced fan blade.

In a sixth embodiment, the preformed mold of a fan blade is lined with reinforcing fibers, impregnated with a thermosetting resin. The aforesaid homogeneous mixture, of hollow spheres and matrix material are inserted into the fiber lined cavity of said mold. Curing of the fan blade is accomplished by suitable means, and, upon separation from said mold, forms a bonded, self-contained, lightweight, high strength fan blade.

In a seventh embodiment, the preformed mold of a fan blade is lined with reinforcing fibers. A plurality of hollow spheres, all being approximately the same size, is mixed with the appropriate matrix material. The size and type of the hollow spheres, and the selection of a matrix material, is dependent upon the particular demands of the application. The hollow spheres and the matrix material are blended to homogeneous mixture. This homogeneous mixture, having fluidic properties, is inserted into the hollow area of the mold cavity until full, thus impregnating said reinforcing fibers. Curing of the fan blade is accomplished by suitable means, and, upon separation from said mold, forms a bonded, self-contained, lightweight, high strength fan blade.

In an eighth embodiment, the preformed mold of a fan blade is lined with reinforcing fibers. A plurality of hollow spheres, all being approximately the same size, is inserted into the cavity of the fiber-lined mold until full. The type and size of the hollow spheres is determined in accordance with the desired properties. An adhesive matrix material, the selection being dependent upon the particular demands, is inserted into the interstices adjacent to points of contact of the hollow spheres; filling said interstices with matrix material and, simultaneously, impregnating said reinforcing fibers used to line the mold cavity. Curing of the fan blade is accomplished by suitable means, and, upon separation from said mold, forms a bonded, self-contained, lightweight, high strength fan blade.

In a ninth embodiment, the preformed mold of a fan blade is lined with reinforcing fibers, impregnated with a thermosetting resin. A plurality of hollow spheres, all being approximately the same size, is inserted into the cavity of said prelined mold until full. The type and size of the hollow spheres is determined in accordance with the desired properties. An adhesive matrix material, the selection of which is dependent upon the particualar demands desired, is inserted into the interstices adjacent to points of contact of the hollow spheres; filling said interstices and said mold with matrix material until full. Curing of the fan blade is accomplished by suitable means, and, upon separation from said mold, forms a bonded, self-contained, lightweight, high strength fan blade.

In a tenth embodiment, the interior cavity of a preformed mold of a fan blade is completely filled with a plurality of hollow spheres, all being approximately the same size. The size and type of hollow spheres is determined in accordance with the desired properties. After slight agitation to ensure close packing of the hollow spheres, an adhesive matrix material, the choice being dependent upon the particular demands of the intended application, is inserted into the interstices, adjacent to points of contact of the hollow spheres, until full, and cured by suitable means; thus forming a bonded, lightweight, reinforced fan blade.

OBJECTS AND ADVANTAGES

Accordingly, the object, feature, and advantage of the present invention to strengthen or fabricate fan blades, facilitates substantial weight savings over the prior art. The practice of prior art has been to use heavier blade material, stronger alloys or reinforcing ribs to increase fan blade strength. This invention's high compressive strength allows the use of lighter weight materials in the fabrication of fan blades, consequently allowing for lighter weight bearings, shafts, and associated hardware.

A further object, feature, and advantage of the invention is its ability to accommodate any size or shape fan blade simply by increasing or decreasing the quantity of hollow spheres and matrix material needed, rather than requiring specific sizing of the prefabricated metal ribs of the prior art.

A further object, feature, and advantage of the invention is the expedient manner and ease by which the process of manufacture, for example by injection, is accomplished; rather than the prior art of sizing, cutting, and welding metal reinforcement ribs in fan blades.

A still further object, feature, and advantage of the invention is its adaptability to a totally automated process of manufacture, through the use of existing injection-type equipment; rather than the use of sophisticated, complex, robotic-type equipment required for the insertion, placement, and welding of the metal reinforcing ribs utilized by the prior art.

A still further object, feature, and advantage of the invention is its durability against rust and corrosion, with a potentially longer life than its steel or aluminum counterparts of the prior art.

A still further object, feature, and advantage of the invention is the substantial increase in the designed safety margin associated with its speed/stress ratio, at any given operating speed, as compared to its steel counterpart of the prior art.

A still further object, feature, and advantage of the invention is that all the aforesaid objects, features, and advantages portray the cost savings that will be realized over the prior art.

Further objects and advantages of the invention will become apparent from a consideration of the drawings and ensuing description of it.

LIST OF REFERENCE NUMERALS

Figure 1:
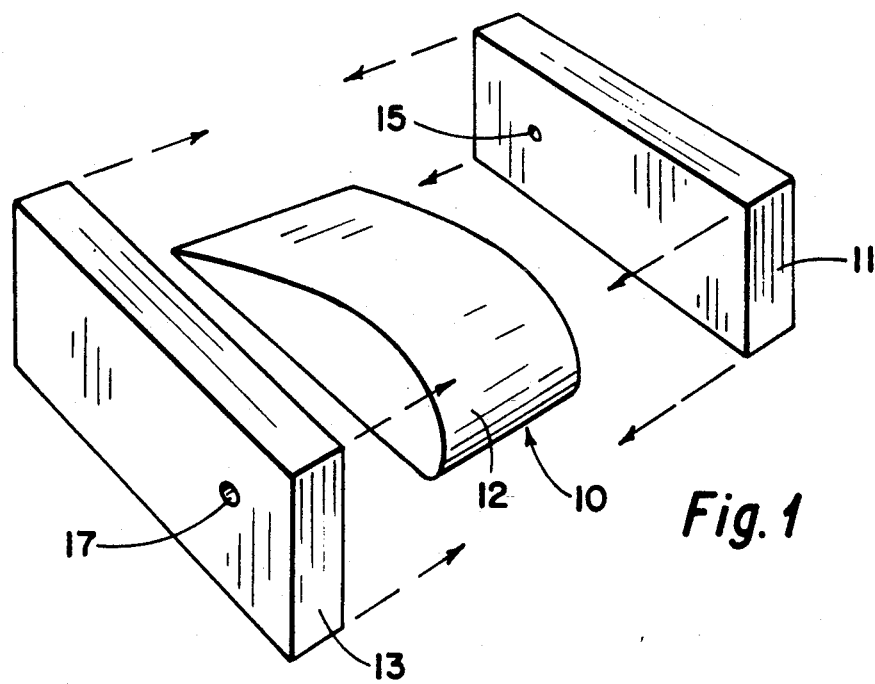
FIG. 1 is a perspective view of a fan blade and material containment plates.

10 Fan blade shape
11 Containment plate
12 Fan blade outer skin
13 Second containment plate
14 Hollow spheres
15 Injection port
16 Interstices between 14
17 Relief port
18 Matrix material
20 Precoated hollow sphere
22 Preformed reusable, mold
26 Reinforcing fibers

DESCRIPTION OF THE PREFERRED EMBODIMENTS

Figure 2:
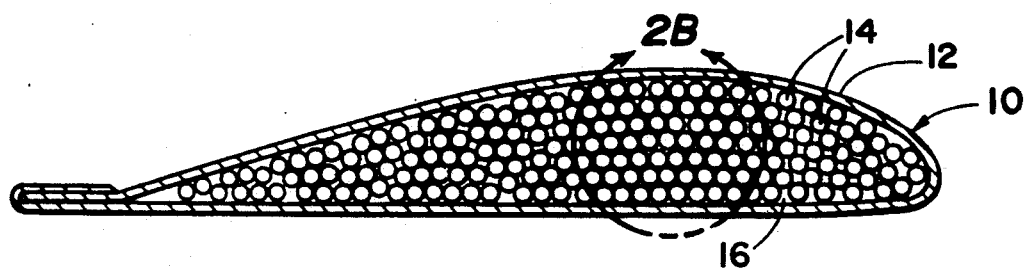
FIG. 2 is an end view of a reinforced fan blade shape.

Referring to FIG. 1 and 2, there is shown a fan blade shape 10. This fan blade shape is formed using prior art and is made of an outer skin 12. This outer skin 12 may be composed of any type of metal, metal alloy, resin, or suitable laminate with or without fiber reinforcement. Blade shape 10, composed of the aforesaid, is open on both ends. A containment plate 11 will be installed on one side of the blade shape 10, thus forming a cavity into which the hollow spheres 14 are inserted. These hollow spheres 14, all being approximately the same size, and can be composed from a wide variety of materials including ceramic, epoxy, phenolic, glass, and Saran. Some hollow spheres presently being offered commercially include hollow ceramic spheres from Microcel Technologies Inc. and hollow glass or ceramic spheres from Minnesota Mining & Mfg. Co. These hollow macrospheres are currently manufactured in sizes ranging from 2-20 mm. The type, size, and density of the hollow spheres 14 is determined in accordance with the desired properties. In the prototypes assembled, considering the blade shape 10 and the desired properties for this particular application, the size of hollow spheres 14 was 3.5 mm, with a wall thickness of 12–50 $\mu$m and a bulk density of approximately 20 pounds per cubic foot. In these prototypes, the insertion process of the hollow spheres 14 was accomplished by a gravity feed method. The plurality of the hollow spheres 14, being all of the same size, round in shape, and light in weight, move easily with fluidic properties, although slight agitation will ensure complete distribution, settling, and contact of each hollow sphere 14 to adjacent hollow spheres 14, in a closely packed, organized, virtually symmetrical arrangement. The insertion of the hollow spheres 14 continues as aforesaid insertion process until blade shape 10 is completely filled. Optionally, other methods of hollow sphere insertion may be effectively utilized by one skilled in the art.

Figure 2A:
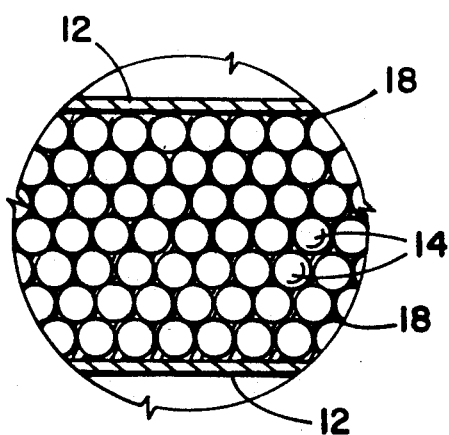
FIG. 2A is an enlarged area view of the embodiments one and four of the invention.
Figure 2B:
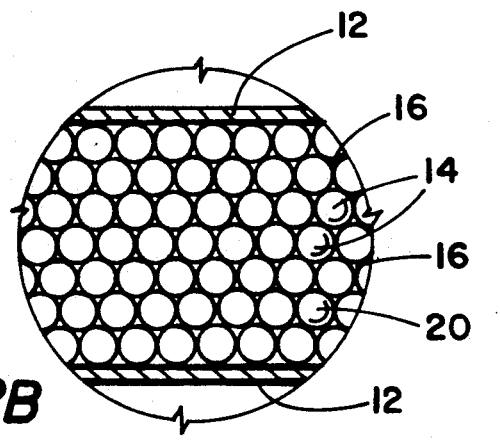
FIG. 2B is an enlarged area view of the second embodiment of the invention.

A second containment plate 13, see FIG. 1, is now placed over the remaining opening of blade shape 10. The two adjoined containment plates 11, 13, make the blade shape 10 ready for the insertion of the matrix material 18. The matrix material 18 is then inserted through insertion port 15 into the interstices 16 adjacent to points of contact of the hollow spheres 14 until some of the matrix material 18 is expelled through relief port 17. The curing process of the fan blade is then accomplished by any suitable means known to one skilled in the art, whereby forming a reinforced fan blade, see FIG. 2A. The selection of the matrix material 18 is dependent upon the properties desired for a particular application. The matrix material 18 may be lightened and/or reinforced through the use of microspheres or other reinforcing fillers such as, but not limited to, ceramic, aramid, steel, glass or carbon fibers, all of which improve the mechanical properties of the matrix material and reduce shrinkage of the composition during the curing process. Any method of insertion can be effectively utilized by one skilled in the art. Two optionally effective methods are, the first being to blend the hollow spheres 14 and matrix material 18 into a homogeneous mixture prior to the insertion process, and the second, see FIG. 2B, is to precoat hollow spheres 20, separate into individual spheres and dry, and insert a plurality of these precoated hollow spheres 20 into fan blade shape 10 leaving interstices 16 void of matrix material 18. The fan blade is then cured by suitable means, thereby forming a bonded, lightweight reinforced fan blade.

Figure 3:
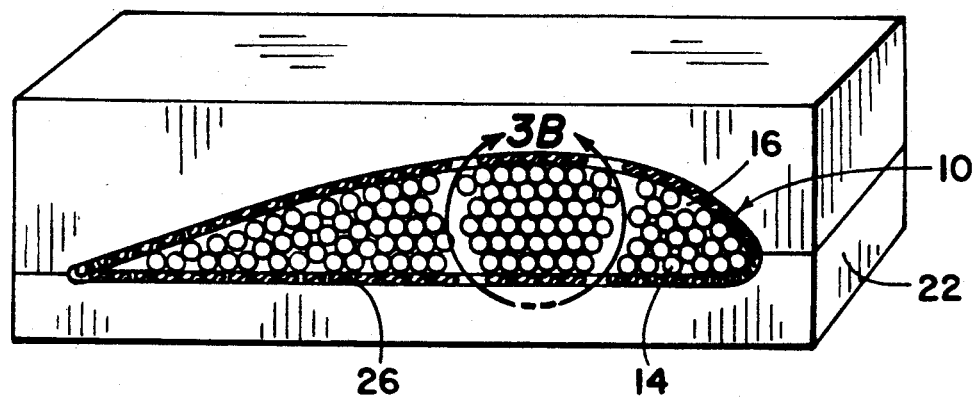
FIG. 3 is a perspective view of a two-piece mold containing a molded fan blade.
Figure 3A:
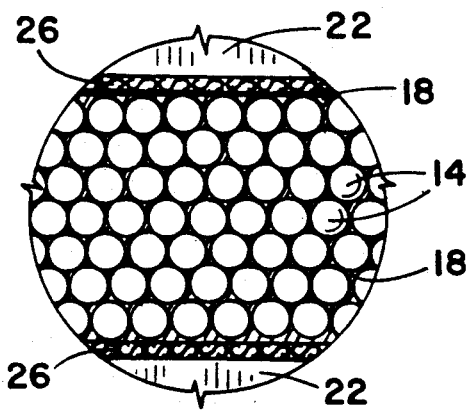
FIG. 3A is an enlarged area view of the sixth, seventh, eighth, and ninth embodiments.
Figure 3B:
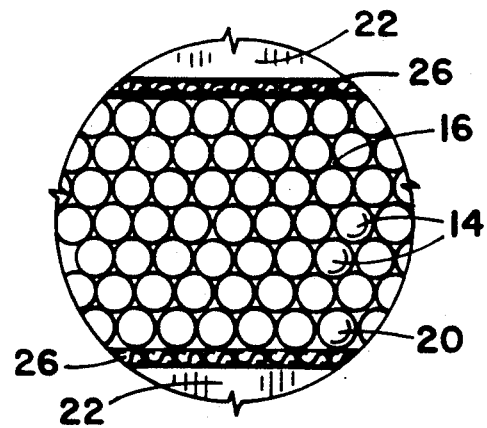
FIG. 3B is an enlarged area view of the third embodiment.
Figure 3C:
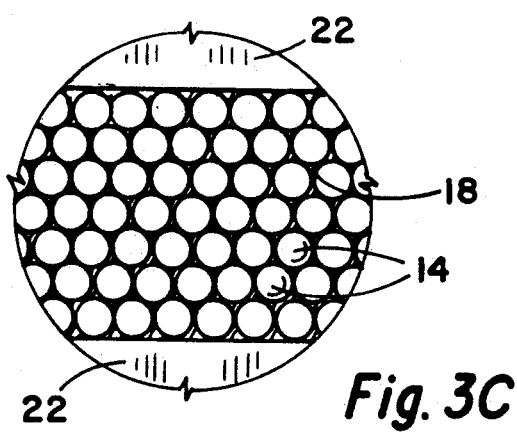
FIG. 3C is an enlarged area view of the fifth and tenth embodiments.

FIG. 3 shows an optional method using a preformed mold 22 of a fan blade shape 10 by which any of the aforesaid methods of sphere and matrix insertion may be utilized by one skilled in the art. FIG. 3C is an enlarged area view of a preformed mold 22 inserted with hollow spheres 14 and matrix material 18, when cured by suitable means and removed from the preformed mold 22, produces a bonded, self-contained, lightweight reinforced fan blade, absent of fan blade outer skin 12. An additional step to the utilization of the preformed mold 22 would be lining the interior surface of the mold cavity, see FIG. 3A and 3B, with reinforcing fibers 26, that could be preimpregnated with resin, prior to the insertion of the hollow spheres 14 and matrix material 18. Curing of the fan blade is then accomplished by suitable means, thereby forming a bonded, self-contained, lightweight reinforced fan blade.

All the aforesaid methods, utilizing hollow spheres of approximately the same size, bonded together with a matrix material, can also be utilized by one skilled in the art to reinforce any shape.

CONCLUSION AND SCOPE OF INVENTION

Thus the reader will see the invention provides a lightweight, high strength, durable and low cost means of strengthening or forming a fan blade.

Other embodiments of this invention will be apparent to those skilled in the art from a consideration of this specification or practice of the invention disclosed herein. For example, retaining studs or necessary placement holding hardware may be incorporated into the forming process of the reinforced fan blade.

Although this invention has been shown and described with reference to detailed embodiments thereof, it will be understood by those skilled in the art that various changes in form, omissions, modifications, and changes to principles described may be made without departing from the spirit and scope of the invention which is indicated by the following claims.

What I claim is:

1. A method of reinforcing a preformed hollow fan blade comprising
   inserting into the hollow area of said blade until full a plurality of closely packed rigid hollow spheres, all being approximately the same size;
   inserting into said blade until full an adhesive matrix material, filling interstices adjacent to points of contact of said spheres contained in said blade; and implementing curing of matrix material by suitable means;
   bonding said spheres, one to another; thereby providing a lightweight, reinforced fan blade.

2. A method of reinforcement as in claim 1 further comprising the steps of
   (a) coating said spheres with a thermosetting resin used as an adhesive matrix material;
   (b) separating said coated spheres into individual spheres;
   (c) drying said coated spheres;
   (d) inserting said coated spheres into said blade until full, allowing for open interstices adjacent to points of contact of said coated spheres.

3. A method of reinforcement as in claim 1 further comprising blending said spheres with said matrix material, forming a homogeneous mixture, prior to insertion.

4. A method of manufacturing said blade as in claim 1 further comprising reinforcing said matrix material by the addition of reinforcing fibers thereby forming a higher strength fan blade.

5. A method of manufacturing said blade as in claim 1 further comprising reducing said matrix material weight by mixing with hollow microspheres, prior to matrix insertion, thereby forming a more lightweight fan blade.

6. A method of manufacturing said blade as in claim 1 further comprising
   incorporating blade mounting hardware into said blade thereby increasing precision and speed of final fan assembly.

7. A method of forming a fan blade utilizing a preformed mold and comprising
   inserting into the cavity of said mold until full a plurality of closely packed rigid hollow spheres, all being approximately the same size;
   inserting into said mold an adhesive matrix material, filling interstices between said spheres contained in said mold;
   implementing curing of matrix material by suitable means;
   bonding said spheres, one to another; and separating said blade from said mold; thereby forming a lightweight, reinforced fan blade.

8. A method of forming said blade as in claim 7 further comprising the steps of
   (a) blending said spheres with said matrix material, forming a homogeneous mixture;
   (b) inserting said homogeneous mixture into said mold until full.

9. A method of forming said blade as in claim 7 further comprising lining the interior surfaces of said mold with reinforcing fibers to be impregnated during matrix insertion.

10. A method of forming said blade as in claim 7 further comprising lining the interior surfaces of said mold with resin impregnated reinforcing fibers.

11. A method of forming said blade as in claim 7 further comprising the steps of
    (a) coating said spheres with a thermosetting resin used as an adjesive matrix material;
    (b) separating and drying said spheres;
    (c) inserting said coated spheres into said mold until full, allowing for open interstices adjacent to points of contact of said coated spheres.

12. A method of manufacturing said blade as in claim 7 further comprising reinforcing said matrix material by the addition of reinforcing fibers thereby forming a higher strength fan blade.

13. A method of manufacturing said blade as in claim 7 further comprising reducing said matrix material weight by mixing with hollow microspheres, prior to matrix insertion, thereby forming a more lightweight fan blade.

14. A method of manufacturing said blade as in claim 7 further comprising incorporating blade mounting hardware into said blade thereby increasing precision and speed of final fan assembly.

15. A method of reinforcement comprising of providing a plurality of closely packed rigid hollow spheres, all being approximately the same size; inserting an adhesive matrix material into the open interstices adjacent to points of contact between said spheres;

curling of matrix material by suitable means; thus bonding said spheres, one to another; thereby providing a lightweight, high strength reinforcement.

16. A method of reinforcement as in claim 15 further comprising reinforcing said matrix material by the addition of reinforcing fibers thereby forming a higher strength reinforcement.

17. A method of reinforcement as in claim 15 further comprising reducing said matrix material weight by mixing with hollow microspheres, prior to matrix insertion, thereby forming more lightweight reinforcement.

18. A method of reinforcement as in claim 15 further comprising of incorporating any appropriate hardware into said reinforcement.

19. A method of reinforcement as in claim 15 further comprising the steps of
 (a) coating said spheres with a thermosetting resin used as an adhesive matrix material;
 (b) separating said coated spheres into individual spheres;
 (c) drying said coated spheres;
 (d) inserting said coated spheres into area to be reinforced until full, allowing for open interstices adjacent to points of contact of said coated spheres.

20. A method of reinforcement comprising of
providing a plurality of closely packed rigid hollow spheres, all being approximately the same size;
blending said spheres with a matrix material, forming a homogeneous mixture prior to insertion into a preformed hollow shape;
inserting said homogeneous mixture into said preformed hollow shape; and
curing of matrix material by suitable means, thus bonding said spheres, one to another.

* * * * *